2,945,795

PROCESS FOR INCREASING THE HARDNESS OF FLEXIBLE RESINOUS COMPOSITION SHEETS BY IRRADIATING THE SAME

Alfred S. Cummin, Glens Falls, N.Y., assignor to Congoleum-Nairn Inc., Kearny, N.J., a corporation of New York No Drawing. Filed May 6, 1955, Ser. No. 506,678

12 Claims. (Cl. 204—158)

This invention relates to a method for improving the physical and chemical properties of smooth surface, flexible, composition floor coverings.

Composition floor coverings, of the type with which the invention is concerned, are composed of binders and fillers in the proportions necessary to provide good wearing qualities, ease of handleability, attractive decoration and low cost. Conventional binders include oxidized and polymerized drying or semidrying oils fused with resins; plasticized thermoplastic synthetic resins; and elastomers, particularly of the thermosetting type. Linseed oil, soya bean oil, tall oil, fish oil and the like may be "cooked" with resins for use as linoleum binders. Properly plasticized polyvinyl chloride, polyvinyl acetate, acrylates, and the like are frequently employed as binders in the preparation of plastic floor coverings. Butadiene-styrene, butadiene-acrylonitrile, and the like are the binders most commonly used for so-called composition rubber floor coverings. Fillers for these and related products are usually chosen from among nonreactive, inexpensive, organic or inorganic materials. Wood flour, calcium carbonate, calcium sulfate, talc, clay, and the like are used in large amounts.

In the preparation of the above type products, the binder is intended to hold together the mass of binder and filler during whatever processing is required to form sheets. This includes calendering, pressing, polishing, and the like. The binder must also permit of decoration; that is, it must be able to hold areas of pigmentation in a given relative position during and after processing. The binder, in conjunction with the filler, also serves as a wearing surface after the product has been sheeted and installed.

A binder prepared from drying oil is called an oleoresinous binder and generally is oxidized and polymerized in a stepwise manner to achieve the properties outlined above. An initial partial oxidation and polymerization provide sufficient strength for the oil to serve as a binder during the formation of sheets. "Curing" or "stoving" which effects further oxidation and polymerization after sheeting brings about the required wearing characteristics. Sheets are also made of products based on thermosetting elastomeric binders. These sheets have a rough and irregular surface and are cut to a convenient size for placement into molds. Heat and pressure are applied in the molds which result in cross linking of the elastomeric binder and the formation of a smooth "set" product. Cross linking agents are sometimes used in this operation. The thermoplastic synthetic resins are initially employed in a relatively highly polymerized state and are made pliable enough for sheeting by the use of well-known plasticizers such as dioctyl phthalate, tricresyl phosphate, and the like and the application of sufficient heat. Thus, to sheet compositions composed of plasticized polyvinyl chloride and filler, it is only necessary to heat the composition until it becomes sufficiently flowable to be processed. Thereafter, upon cooling, the sheet becomes hard, durable, and ready for use.

To be suitable as a floor covering, it is generally accepted that a produst must contain from about 15% to about 75% binder, the upper limit being determined in many respects by cost although in some cases certain product disadvantages become apparent as a result of excessive binder. Linoleum may range from about 20% to about 50% binder although about 35% to about 40% is most frequently used. From about 20% to about 30% of the binder is resin. Natural gums are often used as well as the more conventional rosin in its natural or processed form. Rubber products contain the lowest levels of binder and can be made with as little as about 15% or up to about 35%. 18% to 30% is normally used. Flexible vinyl compositions contain from 30% to 75% of binder, the lower amounts being used for products in the form of sheets which are laminated to an impregnated felt backing and the higher percentages being used for the relatively thick products which contain vinyl composition from the surface to the back thereof. Vinyl resins suitable for use as thermoplastic resinous binders are described in Patent No. 2,624,682. Numerous plasticizers for vinyl resins are set forth in Patent No. 2,558,378 as are examples of complete vinyl compositions which have been employed in the preparation of relatively thin sheets of flexible vinyl. In these and the thicker products, from about 20% to about 35% of a thermoplastic resinous binder is composed of plasticizer, the lesser amounts generally being employed with thicker products.

The remainder of the above compositions is made up for the most part of fillers and pigments. While the fillers and pigments may function differently in part and the same in part, they may be treated as one for many purposes. The term filler as used herein and in the appended claims and unless otherwise clearly defined is intended to include any materials employed for the purpose of pigmentation. It is also meant to include the many special additives frequently used in floor covering compositions such as driers, soaps, oxidation promoters, polymerization promoters, release agents, and the like and the use of which is well known in the art.

The less flexible or semiflexible vinyl compositions contain from about 20% to about 30% of binder, the remainder being made up with a large amount of filler containing considerable asbestos. The present invention is not concerned with this type of product or with other nonflexible or semi-flexible floor coverings such as asphalt tile and the like.

In usable form, the wear layer of the above products ranges in thickness from about 1/40 inch to about 1/4 inch. The thinner of these are usually composed of vinyl composition laminated to an impregnated felt backing while any of them may have a thickness as great as 1/4 inch. Usually a commecial, mass produced product never exceeds 3/16 inch in thickness and standard household products usually do not exceed 1/8 inch. Certain products which are thinner than 1/40 inch and which contain the types of materials described herein are used as surface coatings and as sheeting and are made by different processes and with proportions of ingredients different from those employed in floor coverings. Products which are thicker than 1/4 inch cannot be handled satisfactorily during processing or installation and, of course, are very expensive.

As has been outlined briefly above, the necessary characteristics of a binder are somewhat opposed to each other. A product which can be readily worked generally will not have good wearing characteristics, and a product which has outstanding wearing characteristics will be difficult to work. The binders which have achieved the most widespread use represent the best-known compromise of properties and result in highly satisfactory products. Much of the success of these products is due, however, to the manner of treating them after sheeting or in the manner of sheeting. Products prepared from oleoresinous binders, as aforementioned, are cured after sheeting by stoving, which involves subjecting sheets of material to elevated temperatures ranging from about 150° F. to about 220° F. for varying periods of time ranging from a few days to about a month. Stoving is very expensive and ties up huge amounts of inventory for considerable periods of time. Those products which contain a thermosetting elastomeric binder or a substantial thickness of thermoplastic synthetic resinous binder are pressed instead of calendered because no generally accepted method of continuously sheeting them has been found. The time and cost of this operation are high, and it results in a great deal of waste and variation in decoration. During processing all of the conventional floor covering products are subjected to high compression either by calendering or flat bed pressing to obtain a compact, tough wear layer.

The increased hardness of a floor covering composition which is effected by the operations outlined above is considered highly important to developing a satisfactory finished floor covering product. Products comprised of oleoresinous binders and thermosetting elastomeric binders undergo a considerable increase in hardness during the oxidation and polymerization which occurs in stoving and the thermosetting which occurs in pressing, respectively. Both of these types of compositions are considered to be uncured prior to the latter operations. Floor covering products comprised of thermoplastic binders achieve satisfactory hardness simply by the process of sheeting and therefore when reference is made to them herein and in the appended claims, they are to be considered as uncured in their conventional sheet form. In addition, the term "uncured" is intended to embrace any of the above floor covering products which is only partially cured.

The hardness of a floor covering product is measured in a number of ways, each method being useful in determining definite characteristics of the product. The "$A_2$ Shore Hardness" test is the most sensitive to small differences in the relative hardness of floor covering products. The test is conducted by applying a flat-headed, tapered pin measuring 0.031 inch at the head, perpendicularly to a flat piece of material while the pin is under compression from the action of a calibrated spring. A given standard is selected and deviation therefrom is the determinative factor; for example, the $A_2$ Shore Hardness meter used in all the tests reported herein registered a maximum of a hundred units and had a standard of 60 units when applied to a given piece of spring metal. This instrument is described in detail in the "Tentative Method of Test for Indentation of Rubber by Means of a Durometer," American Society for Testing Materials, ASTM D676–49. Standard linoleum which has been fully stoved has an $A_2$ Shore Hardness reading of about 95–100. A more severe hardness test is conducted by applying a 200 pound load through a flat-headed cylindrical pin measuring 0.282 inch in diameter to the material undergoing the test for a period of one minute and measuring the amount of indentation caused thereby as a percent of the total thickness. This test is of particular value in connection with testing rubber floor coverings. Intermediate tests involve this same procedure but use a 3 pound static load and a 6 pound static load.

It is an object of this invention to improve the wearing characteristics of composition sheet material suitable for use as floor covering. In particular, the invention seeks to improve the hardness of such products after they have once been sheeted and prior to any curing that may ordinarily be required.

In the case of those products requiring stoving, it is an object of the invention to decrease or even eliminate the time required therefor.

The improvement in the hardness of sheets of material prepared from elastomeric and thermoplastic synthetic resinous binders is very important from the point of view of decreasing their tendency to permanent indentation after the application of a static load thereto. Perhaps even more important in connection with these products, however, is the object of the invention to provide a continuous process for their preparation.

It has now been discovered that the above and other objects can be achieved by exposing sheets of uncured, flexible, composition floor covering products containing an oleoresinous, thermoplastic and/or elastomeric binder to atomic radiation.

The internal chemical and physical reactions which take place in floor coverings while being subjected to atomic radiation are manifested primarily by increased hardness. Presumably this results from an increase in energy within the molecules of the binder which in turn causes reactions which are useful in connection with subsequent application of the radiated product as a floor covering. There are several types of energy increase which apparently occur. Conditions of ionization and electronic excitation reflect the principal effect. In addition, there is a certain smaller amount of atomic displacement, lattice disturbance, and to an even lesser extent, transmutation. Unless otherwise clearly defined, the use of the term "energy" herein and in the appended claims is meant to relate to the above described types.

Apparently the energy increase effected in sheets of composition floor covering which have been subjected to atomic radiation in accordance with the invention is due to a transfer of energy from the radiation rather than the type of particle employed for the radiation. On the other hand, particle range, that is, the degree of penetration of a given type of radiation, is important when treating sheets of composition floor covering which are of different composition and thickness than other plastics which, in the past, have been subjected to atomic radiation. The natural particle range of gamma radiation is most useful in the practice of the invention. Very high energy electrons and protons and fast neutrons may be made to achieve a particle range at least on the order of the particle range of gamma radiation, but the accelerators used therefor require huge amounts of space, are difficult to operate and control on a continuous basis with large sheets of material, and are very costly. Alpha particles are not suitable because of their low range. Slow moving neutrons also have a low range and in addition tend to effect radioactivity in the floor covering itself. Consequently, their use is not suitable in the practice of the invention and, in fact, must be avoided. It is for this reason that the radiation of sheets of floor covering in atomic piles is not practical or desirable.

The effect of atomic radiation on sheets of floor covering composition is best demonstrated by the use of gamma radiation, sources for which, at least on a small scale, are readily available as waste products in the production of nuclear weapons. $Fe^{59}$, $Cs^{134}$ and the like may be used in addition to $Co^{60}$. A $Co^{60}$ source was used in each of the detailed examples set forth hereinafter as typical embodiments of the invention. In every case the source was plate shaped and was placed in a large receptacle filled with water. The samples of material to be tested were lowered into the water to a position near the source. The intensity of the source, the placement of the sample, and the time of exposure was such as to provide the amounts of radiation exposure noted. Standard hardness tests were used in testing the samples in each of the examples. Use of the 200 pound indent test was limited to products which employed binders of either the thermoplastic resin type or the elastomeric type. This test is not significant on products such as linoleum until complete or near complete stoving has been accomplished.

Example I

Linoleum composition containing about

25% drying oil (blend of linseed oil, soya bean oil, and crude tall oil)
9.5% resin (rosin acid and modified rosin ester)
62.5% filler (wood flour, calcium carbonate, drier, and pigment)

was formed into sheets in the conventional manner. A sheet 0.050 inch thick was laminated to a sheet of asphalt impregnated backing 0.040 inch thick. Two samples of the uncured floor covering were exposed to 18,500,000 Roentgens and 26,000,000 Roentgens from a $Co^{60}$ source as outlined previously and are referred to as A and B respectively in the following table. $A_2$ Shore Hardness and 3 pound and 6 pound indent resistance tests were conducted in connection with each sample. The same measurements were made on a section of the uncured sheet and the results are listed under control.

|  | Control | A | B |
|---|---|---|---|
| $A_2$ Shore Hardness | 90 | 94 | 94 |
| 3 Lb. Indent | 4.4 | 4.4 | 3.2 |
| 6 Lb. Indent | 6.5 | 6.5 | 4.4 |

Example II

Linoleum composition containing about

25% drying oil (blend of linseed oil, soya bean oil, and crude tall oil)
9.5% resin (rosin acid and modified rosin ester)
62.5% filler (wood flour, calcium carbonate, drier, and pigment)

was sheeted, laminated, subjected to gamma radiation, and tested as in Example I.

|  | Control | A | B |
|---|---|---|---|
| $A_2$ Shore Hardness | 87 | 94 | 94 |
| 3 Lb. Indent | 7.2 | 4.1 | 4.2 |
| 6 Lb. Indent | 8.4 | 6.2 | 5.3 |

Example III

Linoleum composition containing about 26.7% drying oil (blend of linseed oil, soya bean oil, and crude tall oil)
8.8% resin (rosin acid and modified rosin ester)
62.5% filler (wood flour, calcium carbonate, drier, and pigment)

was sheeted, laminated, subjected to gamma radiation, and tested as in Example I.

|  | Control | A | B |
|---|---|---|---|
| $A_2$ Shore Hardness | 88 | 94 | 95 |
| 3 Lb. Indent | 5.2 | 3.2 | 3.2 |
| 6 Lb. Indent | 7.5 | 4.3 | 4.3 |

Example IV

Linoleum composition containing about

25% drying oil (blend of linseed oil, soya bean oil, and crude tall oil)
9.5% resin (rosin acid and modified rosin ester)
62.5% filler (wood flour, calcium carbonate, drier, and pigment)

was sheeted, subjected to gamma radiation, and measured as in Example I. In addition, a sample of this product, labeled C, was exposed to 8,000,000 Roentgens.

|  | Control | C | A | B |
|---|---|---|---|---|
| $A_2$ Shore Hardness | 83 | 89 | 93 | 82 |
| 3 Lb. Indent | 9.3 | 7.1 | 5.6 | 5.5 |
| 6 Lb. Indent | 14.5 | 7.3 | 7.6 | 7.3 |

Example V

A composition containing about 19.8% butadiene-styrene (70/30 ratio butadiene to styrene)
72.9% filler (calcium carbonate, clay, cellulose, silicone, and pigments)
7.3% additives (cross linking agents, resins, soap)

was sheeted in a conventional manner to ⅛ inch thickness. The sample was subjected to radiation in amounts equal to A, B, and C above, and, in addition to the hardness tests used in the previous examples, the 200 pound indent test was made.

|  | Control | C | A | B |
|---|---|---|---|---|
| $A_2$ Shore Hardness | 77 | 83 | 93 | 93 |
| 3 Lb. Indent | 4.0 | 2.5 | 1.4 | 1.3 |
| 6 Lb. Indent | 7.4 | 5.1 | 2.8 | 2.8 |
| 200 Lb. Indent | 100 | 91.6 | 40 | 35.3 |

Example VI

A composition containing about 32.7% polyvinyl chloride copolymerized with vinyl acetate
12.8% plasticizer (di-octyl phthalate, butyl benzyl phthalate, epoxy resin)
51.0% filler (calcium carbonate)
1.5% additive (stabilizers, soap)

was sheeted in the conventional manner to ⅛ inch thickness. The sample was subjected to 26,000,000 Roentgens. All the hardness tests used in the previous examples were made.

|  | Control | Sample |
|---|---|---|
| $A_2$ Shore Hardness | 98 | 100+ |
| 3 Lb. Indent | 4.1 | 2.5 |
| 6 Lb. Indent | 4.1 | 3.3 |
| 200 Lb. Indent | 41.6 | 25.4 |

Example VII

A composition containing about 19.8% butadiene-styrene (70/30 ratio butadiene to styrene)
72.9% filler (calcium carbonate, clay, cellulose, silicone, and pigments)
7.3% additives (no cross linking agents; includes resins and soap)

was sheeted in a conventional manner to ⅛ inch thickness and subjected to 23,500,000 Roentgens and 33,600,000 Roentgens, labeled D and E respectively. The sample was subjected to all of the hardness tests used in the examples set forth heretofore and the control was tested before radiation.

|  | Control | D | E |
|---|---|---|---|
| $A_1$ Shore Hardness | 74 | 84 | 86 |
| 3 Lb. Indent | 5.8 | 3.5 | 2.9 |
| 6 Lb. Indent | 10.0 | 8.0 | 5.0 |
| 200 Lb. Indent | 100 | 76.7 | 69.7 |

Example VIII

Linoleum composed of about

25% drying oil (blend of linseed oil, soya bean oil, and crude tall oil)
9.5% resin (rosin acid and modified rosin ester)
62.5% filler (wood flour, calcium carbonate, drier, and pigment)

was sheeted in a conventional manner to 1/16 inch thickness and subjected to the levels of radiation set forth in Example VII. It tested as follows:

|  | Control | D | E |
| --- | --- | --- | --- |
| $A_2$ Shore Hardness | 75 | 80 | 83 |
| 3 Lb. Indent | 8.5 | 8.3 | 6.7 |
| 6 Lb. Indent | 11.7 | 10.0 | 10.0 |

Example IX

Linoleum as described in Example VIII was laminated to an asphalt impregnated backing measuring 0.040 inch thick and then treated as in Example VIII.

|  | Control | D | E |
| --- | --- | --- | --- |
| $A_2$ Shore Hardness | 74 | 80 | 83 |
| 3 Lb. Indent | 7.1 | 4.9 | 5.0 |
| 6 Lb. Indent | 9.1 | 7.8 | 8.9 |

That the hardness of relatively thick sheets of composition floor covering material can be increased by atomic radiation as described above was unexpected. Even the types of radiation having very high ranges were not believed to have sufficient penetration ability to effect any improvement, but instead were expected to result, at best, in case hardening or, even more likely, a certain amount of degradation of the molecules at the surface of the sheet. It is believed possible, however, that in the case of the highly filled floor covering products, the filler contributes importantly to the operability of the invention. It may result in a more uniform distribution of energy throughout the mass. In all likelihood, it assists in maintaining flexibility although the product hardness increases.

An amount of energy equivalent to that supplied by 8,000,000 Roentgens from a $Co^{60}$ source provides measurable and useful improvement in all floor covering products of the type with which the invention is concerned. In each of the above examples wherein an oleoresinous binder was employed, a considerable saving in stoving time is effected as measured by the increased hardness. Different formulations and increased amounts of radiation will result in further savings. The increased hardness of flexible vinyl composition is of great value in that the most significant disadvantage of flexible vinyl floor covering is its exhibition of indentation marks. The hardness of flexible vinyl floor coverings may be increased on a continuous basis regardless of the thickness thereof provided the limitations on thickness set forth previously are maintained. The most remarkable improvement is shown by those products employing an elastomeric binder of the thermosetting type. While great improvement is noted in regard to these products at a level of radiation of 8,000,000 Roentgens, they become completed floor coverings at about 20,000,000 Roentgens without requiring any further treatment. This, of course, eliminates the necessity of the aforementioned pressing operation and the radiation can be accomplished in a batch or continuous operation.

The amount of atomic radiation to be selected in the practice of the invention may vary widely. As indicated above, the equivalent of the energy supplied by at least about 8,000,000 Roentgens from a $Co^{60}$ source is required before any appreciable increase in hardness is realized in uncured, flexible, composition floor covering products. This amount may be increased to a point where cohesiveness of the floor covering is lost. The factors governing this point are not constant. An acceptable degree of cohesiveness depends primarily on intended use and formulation. Products to be cut into tiles generally require less cohesiveness than products to be used in large sheets. Certain types of decoration require more cohesive compositions than others. Anticipated storage and condition of storage are important. The degree of resiliency required and the backing material employed, if any, are also limiting characteristics. These factors and many others are all within the knowledge of those skilled in the art, and once the limits of cohesiveness are set for a given product, it is a simple matter to determine the amount of atomic radiation that can be tolerated. That amount also is dependent on the previous and anticipated future treatment of the floor covering. In the case of linoleum, for example, partial stoving may be contemplated in advance of radiation. Likewise, partial stoving may follow or accompany radiation. This latter procedure is practical in those cases where stoves are already available and the principal desire of the manufacturer is to decrease stoving time. Such partial treatment is not practical for products other than those using an oleoresinous binder. Any increased hardness, over and above the usual, is of value in products containing a thermoplastic resinous binder providing deleterious effects in connection with other product characteristics do not result. Likewise, there is no saving to be achieved by only partially pressing a sheet of floor covering which contains an elastomeric binder. Once the press is required for any reason, there can be no appreciable savings in time, waste, or cost. According to the invention, however, as aforementioned, such pressing may be completely eliminated.

The most widely used test for measuring the cohesiveness of a floor covering product is the Mandrel test which comprises placing a strip of test material measuring 2 inches by 8 inches decorative side up, around 180° of the peripheral surface of a series of cylinders of progressively decreasing diameters while the test material and the cylinders are at about 77° F. The operator holds the ends of the sample and exerts only enough tension to accomplish complete contact over the entire 180° and thus the sample is always under tension. The result is reported as the diameter of the largest cylinder that the test strip passes before exhibiting separation, breaking, or cracking of the surface of the composition. The conventional flexible floor covering products of the type with which the invention is concerned frequently have Mandrel test readings in the ranges set forth in the following table:

| Product | Over-all Thickness In Inches | Thickness of Backing In Inches | Mandrel test Reading In Inches |
| --- | --- | --- | --- |
| Sheet Linoleum | 0.090 | 0.040 | 1¼-3 |
| Linoleum Tile | 0.090 | 0.040 | 1¼-3 |
| Sheet Vinyl | 0.065 | 0.040 | ¼-1 |
| Vinyl Tile | 0.125 | None | ¼-1 |
| Rubber Tile | 0.125 | None | 1¼-1 |

Nonflexible floor coverings have a Mandrel test reading of 6 or greater. All flexible floor covering products should have a Mandrel test reading of 5 or less.

In the practice of the invention loss of cohesiveness is gradual until severe molecular degradation occurs due to the radiation. This is apparent when the binder of the product undergoing treatment shows evidence of losing its ability to hold the composition together, for example, the development of a friable surface followed by spalling if radiation is continued. The point at which degradation begins is different for each product depending for the most part on the type and kind of binder and the amount and distribution of the other materials which are present. Generally, however, a floor covering product will become unacceptable because of lack of cohesiveness before it becomes unacceptable due to molecular degradation of the binder as a result of atomic radiation.

While the invention has been described in connection with specific and detailed examples, it is not to be limited thereby. Numerous variations known to those skilled in the art may be made in connection with formulating and processing floor coverings and means and devices for subjecting them to atomic radiation. It is possible, for example, to radiate the floor coverings from both sides at the same time. It is possible to increase the temperature of the floor covering and increase the rate of reaction. It is possible to combine curing and radiation. These and many other variations will be apparent to those skilled in the art, and therefore, reference should be had to the appended claims for a definition of the limits of the invention.

What is claimed is:

1. A process for increasing the hardness of flexible resinous composition sheets useful in the manufacture of floor coverings, said sheets having a thickness of about 1/40 to about 1/4 inch, said resinous composition being selected from the group consisting of oleoresinous compositions comprising about 20 to about 50 percent binder comprising partially oxidized and polymerized drying oil and about 80 to about 50 percent filler and rubbery elastomeric compositions comprising about 15 to about 35 percent rubber binder and about 85 to about 65 percent filler, which comprises exposing said sheets to atomic radiation having a particle range of at least substantially of the order of gamma rays in the amount of at least about 8,000,000 Roentgens to yield hardened sheets showing a Mandrel test value of less than 5 inches.

2. The process according to claim 1 wherein the atomic radiation consist essentially of gamma rays.

3. A process for increasing the hardness of sheets of uncured, flexible, composition rubber floor covering material, said sheets measuring from about 1/40 inch to about 1/4 inch in thickness and containing from about 15% to about 35% of a thermosetting elastomeric binder and from about 85% to about 65% filler, which comprises supplying energy to the sheets by exposing them to atomic radiation having a particle range of at least substantially of the order of gamma rays in an amount of at least about 20,000,000 Roentgens and less than that amount which effects a degree of cohesiveness in the floor covering as measured by the Mandrel test below that required for said floor covering.

4. A process according to claim 3 wherein the atomic radiation consists essentially of gamma rays.

5. A process for increasing the hardness of sheets of uncured, flexible, composition rubber floor covering material, said sheets measuring from about 1/40 inch to about 1/4 inch in thickness and containing from about 18% to about 30% of a butadiene-styrene binder and from about 82% to about 70% filler, which comprises supplying energy to the sheets by exposing them to atomic radiation having a particle range of at least substantially of the order of gamma rays in an amount of at least about 20,000,000 Roentgens and less than that amount which effects a degree of cohesiveness in the floor covering as measured by the Mandrel test below that required for said floor covering.

6. A process according to claim 5 wherein the atomic radiation consists essentially of gamma rays.

7. A process for increasing the hardness of sheets of uncured, flexible, composition rubber floor covering material, said sheets measuring from about 1/40 inch to about 1/4 inch in thickness and containing from about 18% to about 30% of a butadiene-acrylonitrile binder and from about 82% to about 70% filler, which comprises supplying energy to the sheets by exposing them to atomic radiation having a particle range of at least about 20,000,000 Roentgens and less than that amount which effects a degree of cohesiveness in the floor covering as measured by the Mandrel test below that required for said floor covering.

8. A process according to claim 7 wherein the atomic radiation consists essentially of gamma rays.

9. A process for increasing the hardness of sheets of uncured, flexible, composition linoleum floor covering material, said sheets measuring from about 1/40 inch to about 1/4 inch in thickness and containing from about 20% to about 50% of an oleoresinous binder and from about 80% to about 50% filler, which comprises supplying energy to the sheets by exposing them to atomic radiation having a particle range of at least substantially of the order of gamma rays in an amount of at least about 8,000,000 Roentgens to yield hardened sheets showing a Mandrel test value of less than 5 inches.

10. A process according to claim 9 wherein the atomic radiation consists essentially of gamma rays.

11. A process for increasing the hardness of sheets of uncured, flexible, composition linoleum floor covering material, said sheets measuring from about 1/40 inch to about 1/4 inch in thickness and containing from about 35% to about 40% binder and from about 65% to about 60% filler, which comprises supplying energy to the sheets by exposing them to atomic radiation having a particle range of at least substantially of the order of gamma rays in an amount of at least about 8,000,000 Roentgens to yield hardened sheets showing a Mandrel test value of less than 5 inches.

12. A process according to claim 11 wherein the atomic radiation consists essentially of gamma rays.

References Cited in the file of this patent

UNITED STATES PATENTS

| | | |
|---|---|---|
| 2,648,097 | Kritchever | Aug. 11, 1953 |
| 2,668,133 | Brophy et al. | Feb. 2, 1954 |

OTHER REFERENCES

"Irradiation of Linear High Polymers," Nature, Dec. 20, 1952, pp. 1075-6.

Sun: "Effects of Atomic Radiation on High Polymers," Modern Plastics, September 1954, pp. 141-4, 146, 148, 150, 229-33, 236-38.